(12) United States Patent
Wang et al.

(10) Patent No.: US 9,172,906 B2
(45) Date of Patent: Oct. 27, 2015

(54) MOBILE COMMUNICATION TERMINAL AND DATA INPUT METHOD

(71) Applicant: Pantech Co., Ltd., Seoul (KR)

(72) Inventors: Sung-Sik Wang, Seoul (KR);
Yong-Hoon Cho, Seoul (KR);
Hoo-Doek Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 184 days.

(21) Appl. No.: 14/058,901

(22) Filed: Oct. 21, 2013

(65) Prior Publication Data

US 2014/0043427 A1 Feb. 13, 2014

Related U.S. Application Data

(63) Continuation of application No. 12/466,587, filed on May 15, 2009, now Pat. No. 8,594,740.

(30) Foreign Application Priority Data

Jun. 11, 2008 (KR) .................. 10-2008-0054445
Oct. 21, 2008 (KR) .................. 10-2008-0103080

(51) Int. Cl.
*H04B 1/38* (2015.01)
*H04N 7/14* (2006.01)
*G06F 17/24* (2006.01)
*H04M 1/725* (2006.01)
*G06F 3/0488* (2013.01)

(52) U.S. Cl.
CPC .............. *H04N 7/141* (2013.01); *G06F 3/0488* (2013.01); *G06F 17/242* (2013.01); *H04M 1/72544* (2013.01)

(58) Field of Classification Search
USPC ......................................... 455/566
See application file for complete search history.

(56) References Cited

U.S. PATENT DOCUMENTS

| | | |
|---|---|---|
| 2005/0030282 A1 | 2/2005 | Lee et al. |
| 2006/0063539 A1 | 3/2006 | Beyer, Jr. |
| 2006/0170669 A1 | 8/2006 | Walker et al. |
| 2007/0253600 A1 | 11/2007 | Furukawa et al. |
| 2008/0003985 A1 | 1/2008 | Jung et al. |
| 2008/0119235 A1 | 5/2008 | Nielsen et al. |

FOREIGN PATENT DOCUMENTS

| | | |
|---|---|---|
| JP | 2000-134456 | 5/2000 |
| JP | 2003-333318 | 11/2003 |
| JP | 2004-165939 | 6/2004 |

(Continued)

OTHER PUBLICATIONS

Non-Final Office Action issued on Sep. 7, 2011 for U.S. Appl. No. 12/466,587.

(Continued)

*Primary Examiner* — Joel Ajayi
(74) *Attorney, Agent, or Firm* — H.C. Park & Associates, PLC (57) ABSTRACT

A mobile communication terminal includes a display module to display image data on an image display area, an input module to generate touch data according to a touch input in a touch area, and a storage module to store the touch data associated with the image data. A data input method includes displaying image data on an image display area, generating touch data according to a touch input in a touch area, associating the touch data with the image data, and storing the touch data associated with the image data.

18 Claims, 12 Drawing Sheets

(56) References Cited

FOREIGN PATENT DOCUMENTS

| | | |
|---|---|---|
| JP | 2005-056244 | 3/2005 |
| KR | 10-0798447 | 1/2008 |

OTHER PUBLICATIONS

Final Office Action issued on Mar. 2, 2012 for U.S. Appl. No. 12/466,587.

Non-Final Office Action issued on Dec. 21, 2012 for U.S. Appl. No. 12/466,587.

Final Office Action issued on Mar. 29, 2013 for U.S. Appl. No. 12/466,587.

Notice of Allowance issued on Jul. 19, 2013 for U.S. Appl. No. 12/466,587.

Extended Search Report issued Sep. 25, 2009 by the European Patent Office in corresponding European Patent Application No. 09161198.8.

MOBILE COMMUNICATION TERMINAL AND DATA INPUT METHOD

CROSS-REFERENCE TO RELATED APPLICATIONS

This application is a continuation of U.S. patent application Ser. No. 12/466,587, filed on May 15, 2009, and claims priority from and the benefit of Korean Patent Application No. 10-2008-0054445, filed on Jun. 11, 2008 and Korean Patent Application No. 10-2008-0103080, filed on Oct. 21, 2008, all of which are hereby incorporated by reference for all purposes as if fully set forth herein.

BACKGROUND OF THE INVENTION

1. Field of the Invention

The present invention relates to a data input method and a mobile communication terminal that may display touch data such as characters and pictures along with image data on an image display area, may generate touch data according to a touch input in a touch area, and may store the touch data associated with the image data.

2. Discussion of the Background

With increased usage and development of communication technologies, various services such as games, wireless Internet connectivity, still and video image capture, and the like, are provided in a mobile communication terminal, along with voice call service and a short message service (SMS).

A user may record moving images and take photos using a camera installed in a mobile communication terminal. Image data taken from photos and moving images may be transmitted to one or more other mobile communication terminals using a multimedia messaging service (MMS).

Figure 1:
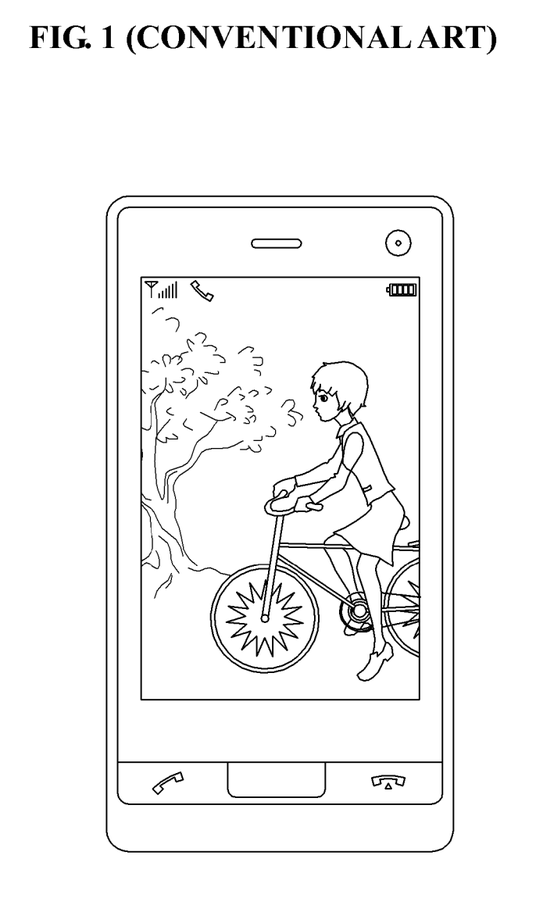
FIG. 1 is a diagram illustrating an example of recording moving images in a mobile communication terminal according to a conventional art.

FIG. 1 is a diagram illustrating an example of recording moving images in a mobile communication terminal.

The mobile communication terminal may generate image data based on a user's operation, and may store the generated image data in a storage module. However, the mobile communication terminal has no capability to insert characters and pictures into the image data when generating the image data. That is, mobile communication terminal may not provide such functions as inserting pictures and characters into the image data.

Accordingly, a new technique is required to save touch data, such as characters and pictures, associated with image data and to display the touch data along with the image data when the image data is played or retrieved.

SUMMARY OF THE INVENTION

This invention provides a data input method where touch data can be generated according to a touch input in a touch area corresponding to the image display area. The touch data may be associated with image data, and stored so that when the image data is displayed, the touch data is also displayed. This invention also provides a mobile communication terminal to perform the data input method.

This invention also provides a data input method that may increase user enjoyment by associating touch data, such as characters, icons, and graphics, with image data. This invention also provides a mobile communication terminal to perform the method.

According to exemplary embodiments of the present invention, a user of a mobile communication terminal may share a memo sharing area while viewing a video call screen of another user to generate character and picture data in real time, and transmit the generated character and picture data in real time, and another mobile communication terminal may simultaneously verify a video call screen and a memo sharing area of the other user, thereby providing an environment in which communication between users may be effectively and smoothly performed.

Additional features of the invention will be set forth in the description which follows, and in part will be apparent from the description, or may be learned by practice of the invention.

This invention discloses a mobile communication terminal including a display module to display image data on an image display area, an input module to generate touch data according to a touch input in a touch area, and a storage module to store the touch data associated with the image data.

This invention discloses a data input method including displaying image data on an image display area, generating touch data according to a touch input in a touch area, associating the touch data with the image data, and storing the touch data associated the image data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

A mobile communication terminal as used throughout the present specification may be, for example and without specific limitation, a computer, a public switched telephone network (PSTN) terminal, a voice over Internet protocol (VoIP) terminal, a session initiation protocol (SIP) terminal, a media gateway control (Megaco) terminal, a personal digital assistant (PDA), a mobile phone, a personal communication service (PCS) phone, a hand-held personal computer (PC), a Code Division Multiple Access (CDMA)-2000 (1X,3X) phone, a Wideband CDMA (WCDMA) phone, a dual band/dual mode phone, a Global System for Mobile Communications (GSM) phone, a mobile broadband system (MBS) phone, or a satellite/terrestrial Digital Multimedia Broadcasting (DMB) phone.

Figure 2:
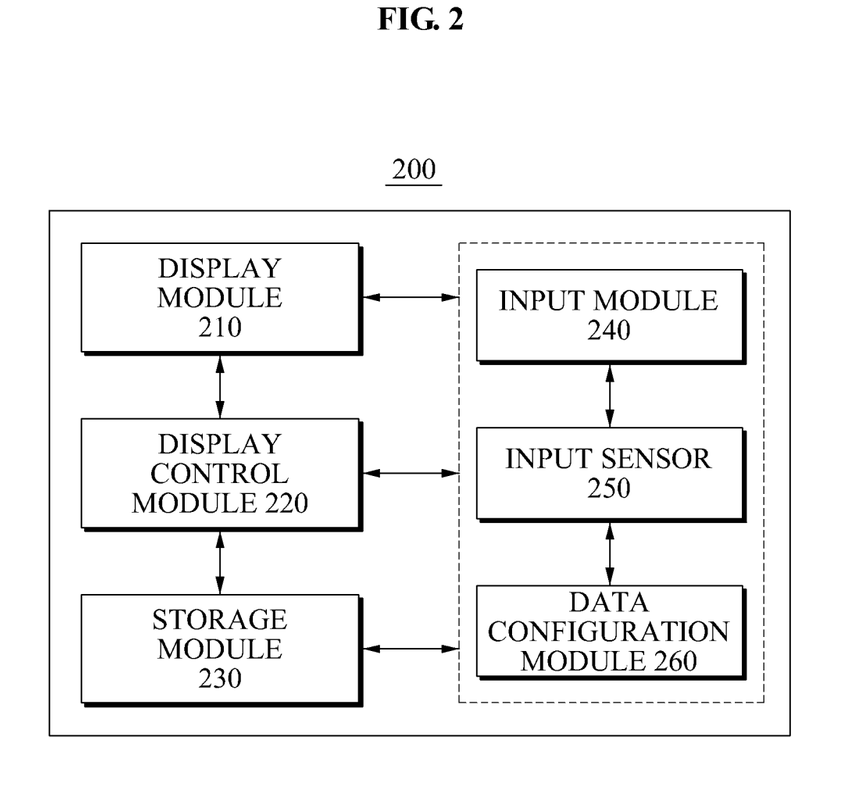
FIG. 2 is a diagram illustrating a configuration of a mobile communication terminal according to an exemplary embodiment of the present invention.

FIG. 2 is a diagram illustrating a configuration of a mobile communication terminal 200 according to an exemplary embodiment of the present invention.

As illustrated, the mobile communication terminal 200 may include a display module 210, a display control module 220, a storage module 230, an input module 240, an input sensor 250, and a data configuration module 260.

The display module 210 may display image data, generated via a camera or received from another mobile communication terminal, such as by MMS, on an image display area. The image data may be a still image or picture, or video or moving images, taken via a camera installed in the mobile communication terminal 200 or received from another mobile communication terminal, such as by MMS. Alternatively, the image data may be a document with characters, with or without images, in an application-specific format, such as pdf, or in an image format, such as JPEG. The image data may be captured by the mobile communication terminal, or may be received at the mobile communication terminal by MMS, through an email server and an email application on the mobile communication terminal, through an internet application on the mobile communication terminal, or through any other wireless or wired data transfer mechanism, including without limitation a device-to-device transfer mechanism, such as a short range wireless communication module including an Infrared Data Association (IrDA) module or a Bluetooth® module. The image display area may be an area displaying images on a screen.

The input module 240 may generate touch data according to a touch input in a touch area corresponding to the image display area. The touch area may include all of the image display area. That is, to receive the touch data from a user, the touch area may be arranged to correspond to the image display area. As an example, the touch data may be any graphical data, including characters, figures, pictures, emoticons, diagrams and the like, and may be inputted via various devices such as sticks or a stylus, pens, fingers, and the like. The user may also select other features of the touch data, such as color or thickness.

For this, the input sensor 250 may calculate coordinate information about a point or series of points where the touch input is received in the touch area. The coordinate information may be specific information about where the touch data is inputted on the touch area, and, based on the coordinate information, includes a location where the touch data is to be displayed and/or data about whether the touch data corresponds to one of characters, pictures, diagrams, figures, and emoticons.

The data configuration module 260 may generate the touch data based on the calculated coordinate information. Also, the data configuration module 260 may obtain time information of a time when the touch input is received, and may associate the touch data with the image data based on the obtained time information and the coordinate information.

That is, by associating the touch data along with the image data based on the time information and the coordinate information, when the image data is played back or retrieved or selected to be displayed on the mobile communication terminal 200, the data configuration module 260 enables the touch data to be displayed on the display module 210 along with the image data at a time during the playback corresponding to a time when the touch data is inputted. As an example, if five minutes of video as image data is generated, and touch data of 'DUMMY' is inputted at a time of two minutes thirty seconds into the generation or playback of the video, the data configuration module 260 may mix the touch data with the image data representing the video at that time and the display module 210 will display the touch data of 'DUMMY' at two minutes and thirty seconds when next playing back the video.

If the touch input moves over the touch area, the data configuration module 260 may generate touch data having a shape that corresponds to the movement of the touch input.

If the display module 210 provides an emoticon via the image display area, a user may select an emoticon, and thereafter the input module 240 may generate a selected emoticon as the touch data.

The storage module 230 may store the generated touch data along with the image data. That is, the storage module 230 may store the touch data including the time information and coordinate information as data associated with the image data. Throughout this specification, the touch data is described as data "associated with" the image data, and this description is intended to cover many different storage options. One storage option is that the touch data may be stored separately from the image data, as a separate file, but that data associating the image data and the touch data will also be generated and stored. In this manner, the storage module 230 may be able to retrieve the image data in a first format with the touch data or in a second format without the touch data. Alternatively, another storage option is that the touch data is stored as embedded data in the image data, and that the touch data and image data are stored as a single file in the storage module 230. The single file may be encoded and/or compressed. Depending on the storage scheme, a user of the mobile communication terminal may select image data, touch data, or a combination thereof to send to another mobile communication terminal by, for example, MMS. Then, a user may send image data including touch data, or may send either image data or touch data separately.

The display control module 220 may control the touch data to be displayed on the image display area along with the image data. That is, the display control module 220 may control the image data to be associated and displayed with the touch data.

Figure 3:
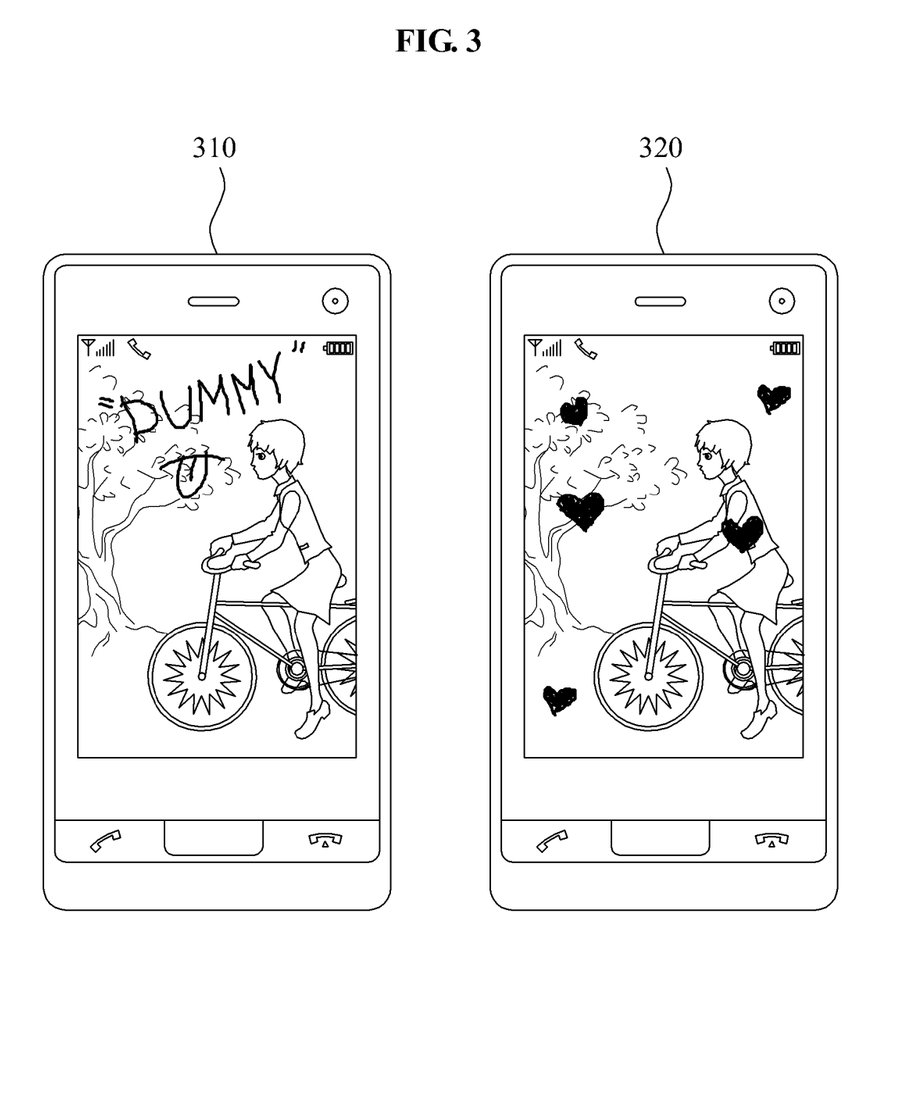
FIG. 3 is a diagram illustrating an example of generating image data in the mobile communication terminal of FIG. 2.

FIG. 3 is a diagram illustrating an example of generating image data in the mobile communication terminal 200 of FIG. 2.

As shown in a reference numeral 310, the mobile communication terminal 200 may receive the touch data of 'DUMMY' from the user in the touch area and display the touch data on the image display area. The user may input the touch data of 'DUMMY' using fingers, stylus or sticks, pens, and the like. The mobile communication terminal 200 may store the touch data of 'DUMMY' in the storage module 230 by associating the touch data with the image data based on the time information when the touch data of 'DUMMY' is inputted and coordinate information corresponding to a location on the image data where the touch data is input on the image display area.

Alternatively, as shown in a reference numeral 320, the mobile communication terminal 200 may receive an emoticon, heart shapes in this instance, as touch data when the touch data is generated. If the emoticon is generated as touch data, when the user selects the emoticon and selects a point where the emoticon is to be located, the mobile communication terminal 200 may display the emoticon on the established coordinates where the emoticon is to be located. As explained above, the mobile communication terminal 200 may store the touch data by associating the touch data with the image data in the storage module 230. In this instance, the touch data will include the type of emoticon, the time information, and the coordinate information.

As an example, the mobile communication terminal 200 may provide a list of possible emoticons, permit a user to select one or more emoticons from the provided list of emoticons, and generate the selected emoticon as touch data when the touch input is received. Thus, the user may create or receive new emoticons to add to the list, and revise or delete existing emoticons from the list of emoticons.

Figure 4:
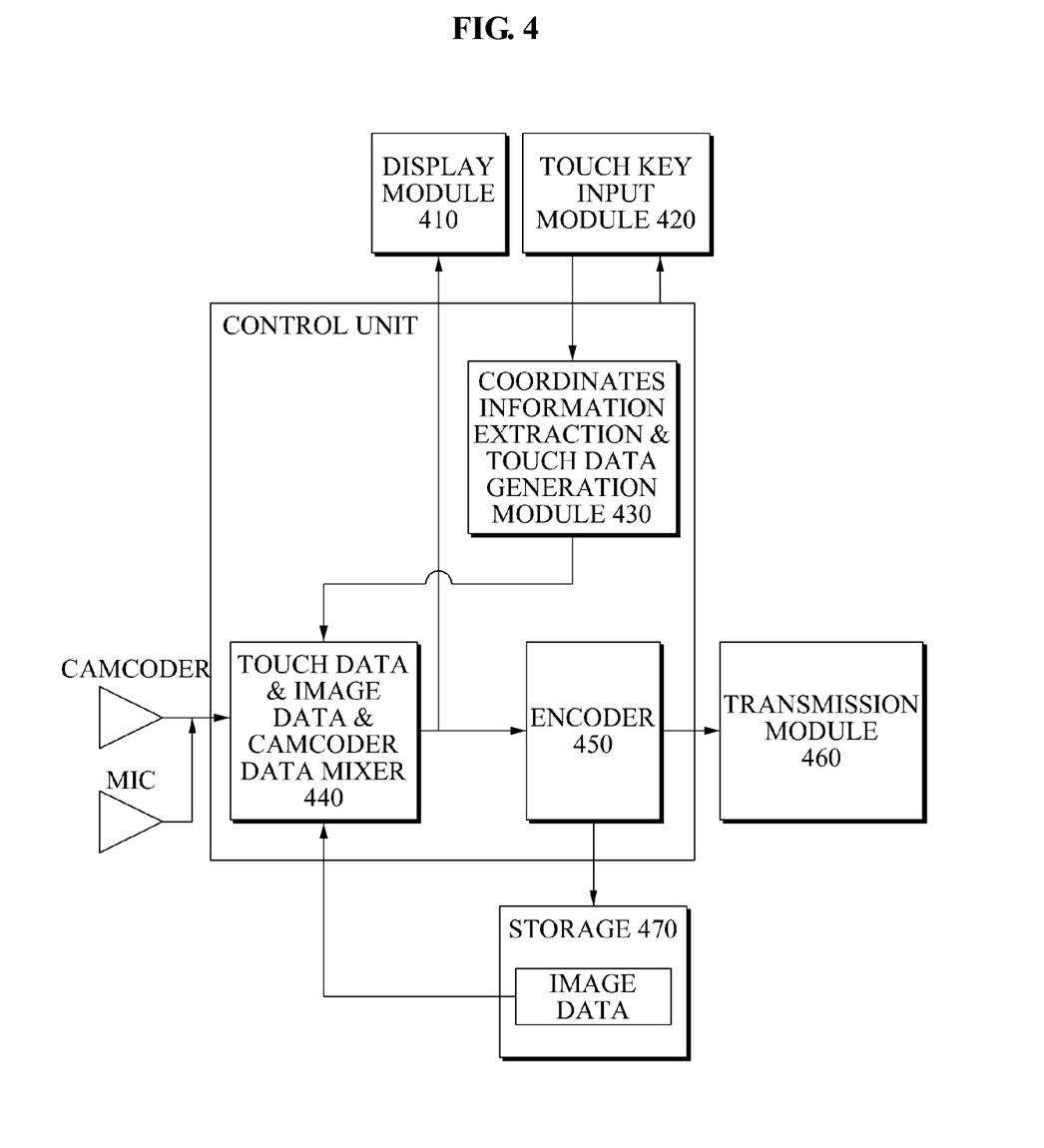
FIG. 4 is a diagram illustrating another configuration of a mobile communication terminal according to an exemplary embodiment of the present invention.

FIG. 4 is a diagram illustrating another configuration of a mobile communication terminal 400 according to an exemplary embodiment of the present invention.

The mobile communication terminal 400 may include a display module 410, a touch key input module 420, a coordinates information extraction and touch data generation module 430, a touch data & image data & camcorder data mixer 440, an encoder 450, a transmission module 460, and a storage 470.

The display module 410 may display image data on an image display area via a camcorder and a microphone (MIC), and the touch key input module 420 may receive touch data from a user. When the user touches the touch area, the coordinates information extraction & touch data generation module 430 may generate the touch data by extracting touched coordinate information. The generated touch data may be associated with the image data in the touch data & input data & camcorder data mixer 440. The encoder 450 may encode the image data and touch data, and the mobile communication terminal may store the encoded image data and touch data in the storage 470. In this context, the storage 470 may store the encoded image data and touch data as a single encoded file. The transmission module 460 may transmit the encoded image data and touch data, such as to another mobile communication terminal by MMS, through an email application, through an internet-based application, or through a wireless or wired data transfer mechanism.

Figure 5:
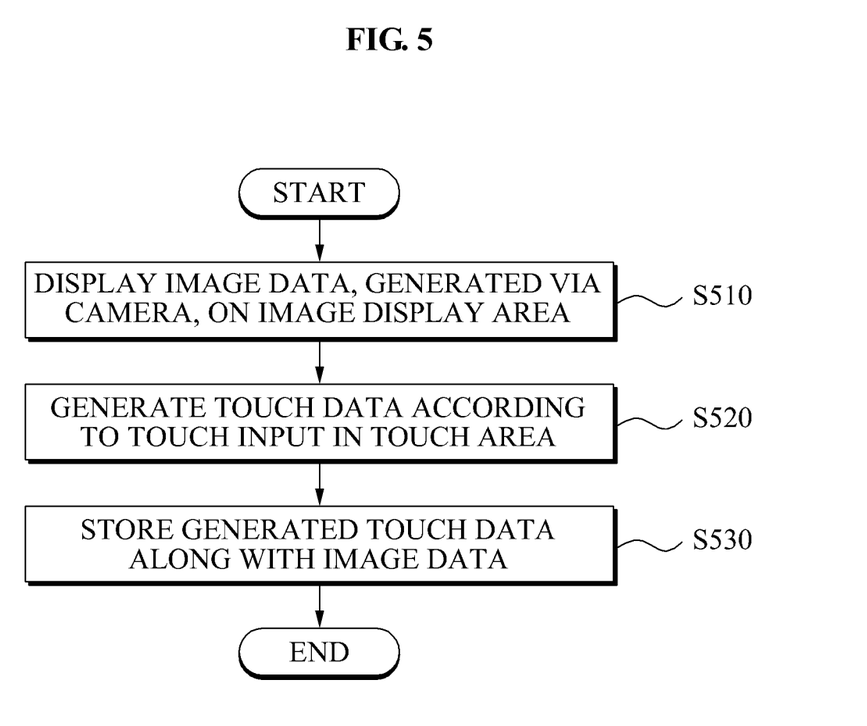
FIG. 5 is a flowchart illustrating a data input method according to an exemplary embodiment of the present invention.

FIG. 5 is a flowchart illustrating a data input method according to an exemplary embodiment of the present invention.

The data input method may be implemented in the mobile communication terminal 200 of FIG. 2 or may be implemented in the mobile communication terminal of FIG. 4. The data input method is described above with respect to the mobile communication terminal 200 shown in FIG. 2.

In operation S510, the mobile communication terminal 200 may display image data on an image display area. The various types of image data are described in more detail above. The image display area may be an area where pictures taken via a camera in the mobile communication terminal 200 are displayed.

In operation S520, the mobile communication terminal 200 may generate touch data according to a touch input in a touch area corresponding to the image display area. The touch area may cover or include all of the image display area. The mobile communication terminal 200 may obtain time information of a time when the touch input is received via a timer and may calculate coordinate information about a point where the touch input is received in the touch area.

In operation S530, the mobile communication terminal 200 may store the generated touch data associated with the image data in the storage module 230. That is, the mobile communication terminal 200 may associate the touch data with the image data based on the time information and the coordinate information, and may store the associated data in the storage module 230, thereby enabling the touch data and the image data to be retrieved from the storage module 230 and displayed on a display module 210.

Similarly, the mobile communication terminal 200, as illustrated in FIG. 3, may display the generated touch data on the image display area along with the image data.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may include a processor to execute the program instructions and a memory, and may be configured to act as one or more software modules in order to perform the operations of the above-described exemplary embodiments of the present invention.

According to the exemplary embodiments of the present invention, touch data can be generated according to a touch input in a touch area corresponding to the image display area. The touch data may be associated with the image data, and stored so that when the image data is retrieved and displayed, the touch data is also displayed.

According to the exemplary embodiments of the present invention, user enjoyment may be increased by associating touch data, such as characters, icons, and graphics, with image data.

Figure 6:
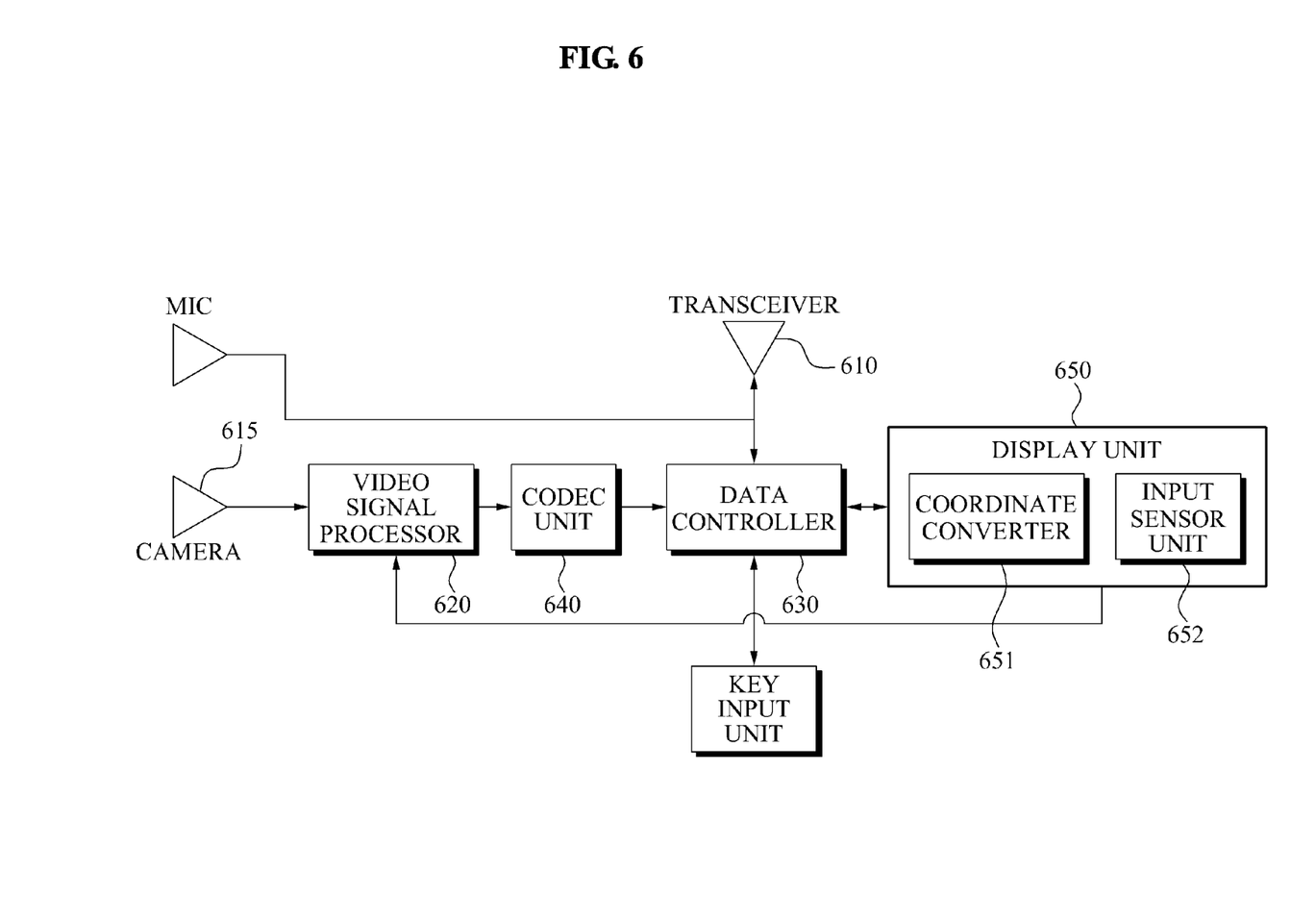
FIG. 6 is a diagram illustrating a configuration of a mobile communication terminal capable of sharing a display area during a video call according to an exemplary embodiment of the present invention.

FIG. 6 is a diagram illustrating a configuration of a mobile communication terminal capable of sharing a display area during a video call according to an exemplary embodiment of the present invention. A configuration of a mobile communication terminal capable of sharing a display area during a video call according to an exemplary embodiment of the present invention will be described with reference to FIG. 6.

Referring to FIG. 6, the mobile communication terminal capable of sharing a display area during a video call according to an exemplary embodiment of the present invention may include a transceiver 610, a camera 615, a video signal processor 620, a codec unit 640, a data controller 630, and a display unit 650. The display unit 650 may include a coordinate converter 651 and an input sensor unit 652.

The transceiver 610 may receive first user touch information input to another mobile communication terminal, and first image information photographed in the other mobile communication terminal.

In this instance, the first user touch information may refer to data information, such as a memo, a picture, and the like, generated by a user through a touch screen in a memo sharing area on a touch screen display area, and the first image information may refer to image information photographed through a camera in the other mobile communication terminal. The transceiver 610 may receive the first user touch information and the first image information.

The memo sharing area according to an exemplary embodiment of the present invention may refer to a sharing area located in a predetermined place in a display area of a terminal, and not be limited to a particular place.

When receiving a user input indication (UII) message, the memo sharing area may be expanded, and the UII message may additionally include terminal control data, such as a vibration, a light emitting diode (LED), and the like, and be delivered.

The video signal processor 620 may control the received first user touch information and first image information to be displayed.

That is, the video signal processor 620 may control the received first user touch information and first image information to be displayed on the display unit 650, and each of the first user touch information and the first image information may be displayed on a separate area on the display unit 650.

The data controller 630 may generate second user touch information by mapping touch information generated through a touch input of a user on the displayed first user touch information.

That is, the data controller 630 may generate the second user touch information by additionally generating data information, such as a memo, a picture, and the like, generated through a touch input of a user on the first user touch information received by the other mobile communication terminal.

The video signal processor 620 may control the generated second user touch information and the first image information corresponding to an image photographed by a camera received from the other mobile communication terminal to be displayed.

The transceiver 610 may transmit the second user touch information to the other mobile communication terminal, and enable the other mobile communication terminal to receive data information, such as a memo, a picture, and the like, input by a user.

In this instance, the data controller 630 may control a camera 615 to generate the second image information, and control the second image information to be associated with the second user touch information. That is, the data controller 630 may associate an image photographed by a user with a memo or a picture image input by the user, and provide the image associated with the memo or the picture image to the other mobile communication terminal.

The codec unit 640 may encode the associated second image information and second user touch information.

The transceiver 610 may transmit, to the other mobile communication terminal, the encoded second image information and second user touch information.

That is, the second image information photographed and input by a camera 615 may be associated with the second user touch information, encoded by the codec unit 640, and transmitted to the other mobile communication terminal via the data controller 630.

The other mobile communication terminal may decode the second image information in the same scheme as general video data, and display the second image information on a screen.

Thus, according to an exemplary embodiment of the present invention, an image photographed by a user and a memo or a picture image input by the user may be simultaneously provided through a real-time transmission by associating the second image information with the second user touch information.

The video signal processor 620 may control each of the first user touch information and the first image information to be displayed on a separate area, and control each of the second user touch information and the first image information to be displayed on a separate area.

The first user touch information and the second user touch information may be displayed to overlap the first image information. That is, a memo input by a user and a memo input by an opponent user may be displayed in an overlapping form on an image of the opponent user using a telephone.

The display unit 650 may display the first user touch information, the second user touch information, the first image information, and the like.

In particular, the display unit 650 may receive an input of touch information generated through a touch input of a user.

More particularly, the display unit 650 may include a coordinate converter 651 and an input sensor unit 652.

The input sensor unit 652 may receive a touch input of a user, and the coordinate converter 651 may convert the received touch input to a coordinate value. Information about the touch input of the user converted to a coordinate value may be delivered to the data controller 630, and be provided to the other mobile communication terminal through the transceiver 610.

Figure 7:
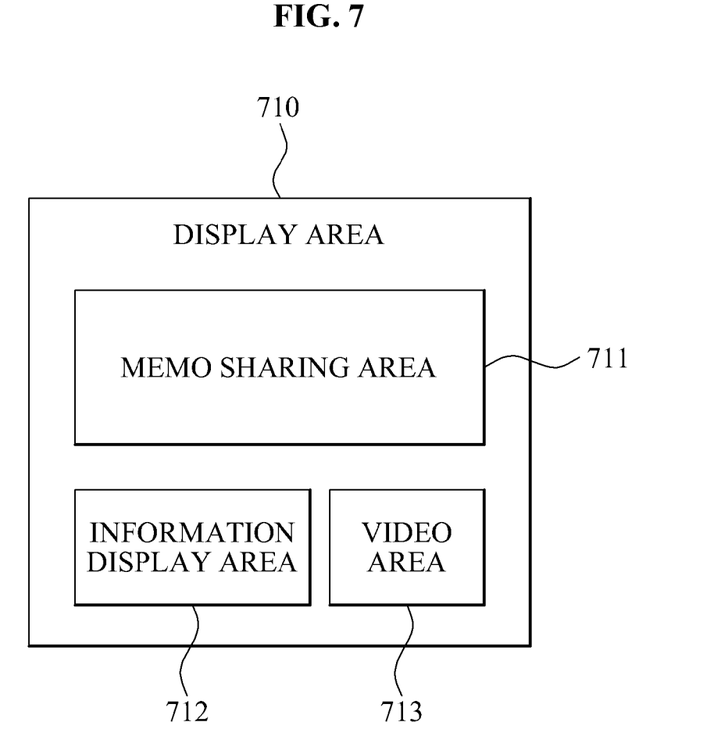
FIG. 7 is a diagram illustrating a display area of a mobile communication terminal capable of sharing a display area during a video call according to an exemplary embodiment of the present invention.

FIG. 7 is a diagram illustrating a display area of a mobile communication terminal capable of sharing a display area during a video call according to an exemplary embodiment of the present invention.

Referring to FIG. 7, a display area 710 may include a memo sharing area 711, an information display area 712, and a video area 713.

In the memo sharing area 711, data information, such as a memo, a picture, and the like, generated by touching on a screen by a user of another mobile communication terminal, and data information, such as a memo, a picture, and the like, generated through a touch input by a user may be displayed.

An input touch delivered through the input sensor unit 652 may be converted to coordinate information by the coordinate converter 651, and be included on a screen in a buffer of the data controller 630, and the data information, such as a memo, a picture, and the like, may be displayed on the memo sharing area 711 of the display unit 650 by a control of the video signal processor 620.

The information display area 712 may correspond to an area for displaying various types of use information, such as information associated with an opponent mobile communication terminal user, information associated with a video call, information about taking a photograph using a camera, information about setting a memo sharing area, and the like.

In the video area 713, an image photographed and received from a camera of a mobile communication terminal of an opponent user may be displayed.

The memo sharing area 711 described in the foregoing may be constructed to overlap on the video area 713, and be constructed so that an area according to a requirement of various users may be disposed.

Figure 8:
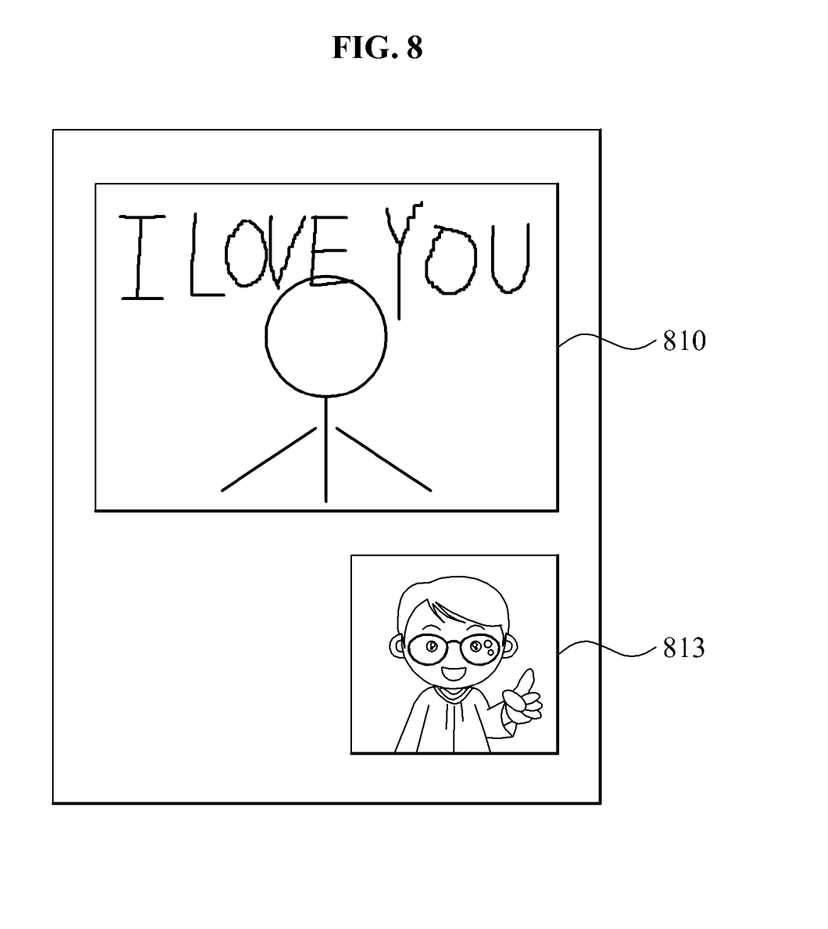
FIG. 8, FIG. 9, and FIG. 10 are diagrams illustrating an example of a display of a mobile communication terminal capable of sharing a display area during a video call according to an exemplary embodiment of the present invention.
Figure 9:
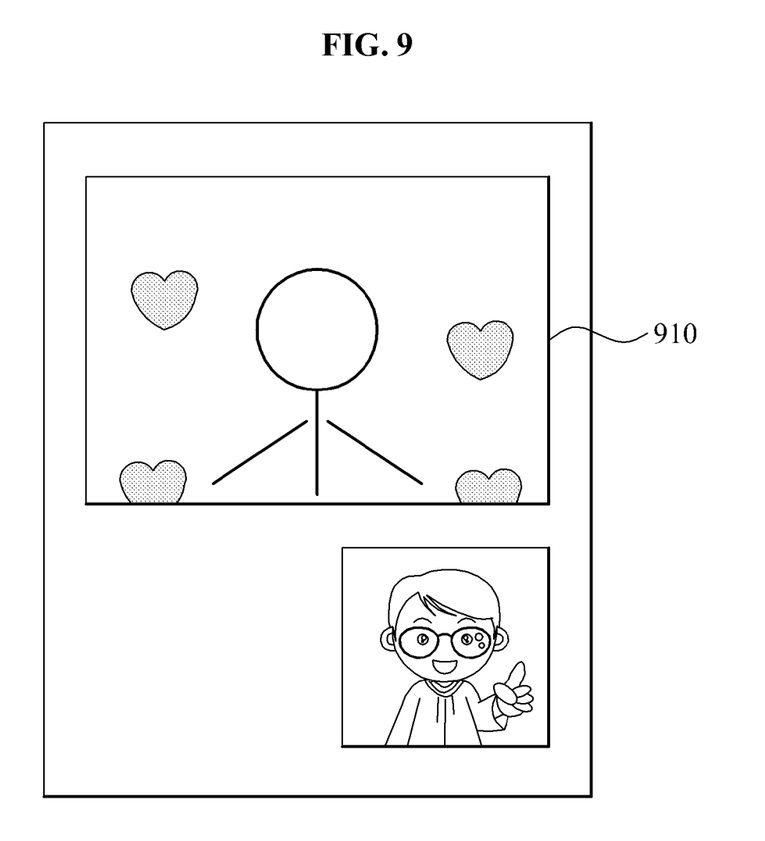
Figure 10:
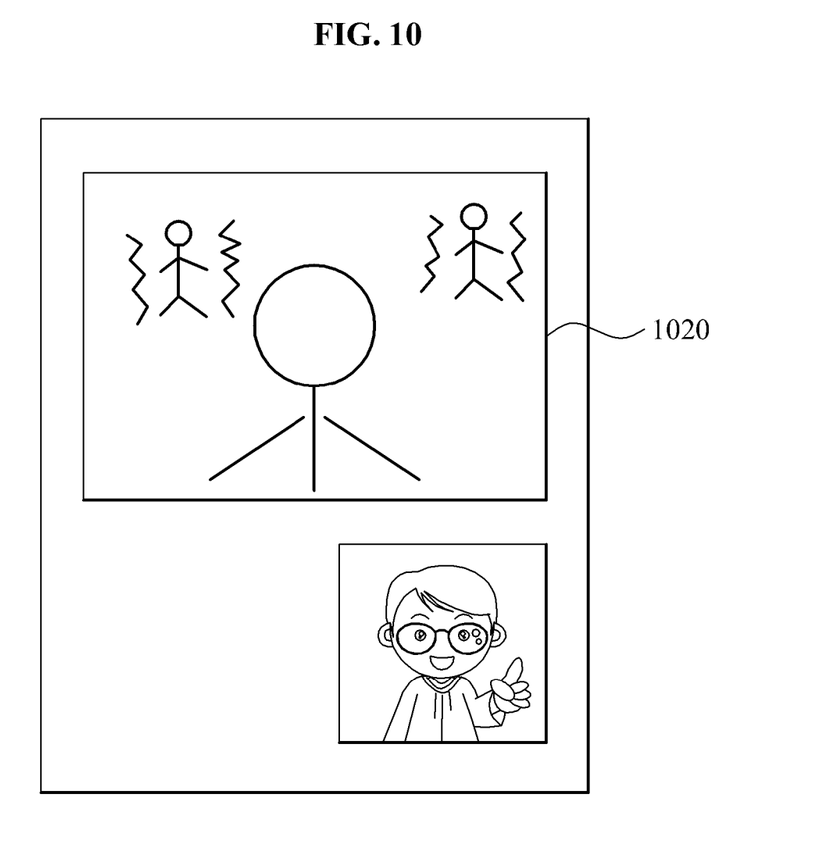

FIG. 8, FIG. 9, and FIG. 10 are diagrams illustrating an example of a display of a mobile communication terminal capable of sharing a display area during a video call according to an exemplary embodiment of the present invention.

Referring to FIG. 8, FIG. 9, and FIG. 10, sharing a memo area during a video call may allow effective and smooth communication between users.

That is, as illustrated in FIG. 8, various memos, pictures, and the like, may be recorded and displayed on a memo sharing area 810 separated from a video area 813. As illustrated in FIG. 9, a picture icon, such as a heart, and the like, may be input to a memo sharing area 910. As illustrated in FIG. 10, a moving icon, and the like, may be input to a memo sharing area 1020, which allows various types of communication.

In this instance, when receiving a UII message during a video call, the memo sharing area may be expanded. Further, the UII message may additionally include terminal control data, such as a vibration, an LED, and the like, and be delivered.

When an initial connection for a video call is made, field data may be exchanged to verify whether the corresponding function may be supported. When the corresponding function is supported, generated data may be constructed by each string. When the generated data corresponds to pen data of a drawing, a run-length compression may be used for a string text to transmit data. A receiving mobile communication terminal may reproduce data through a reverse process, and display the reproduced data on a screen by associating the reproduced data with image data.

Figure 11:
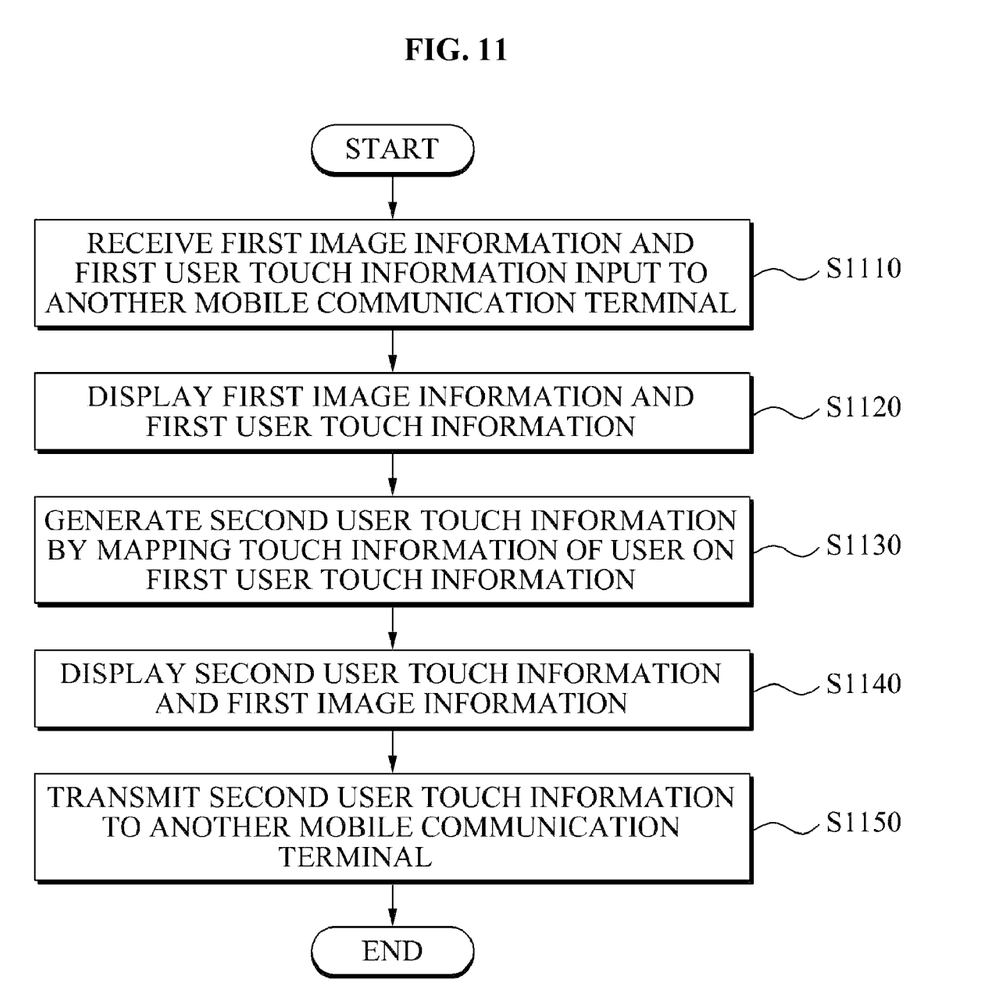
FIG. 11 and FIG. 12 are flowcharts illustrating a method of controlling a mobile communication terminal capable of sharing a display area during a video call according to an exemplary embodiment of the present invention.
Figure 12:
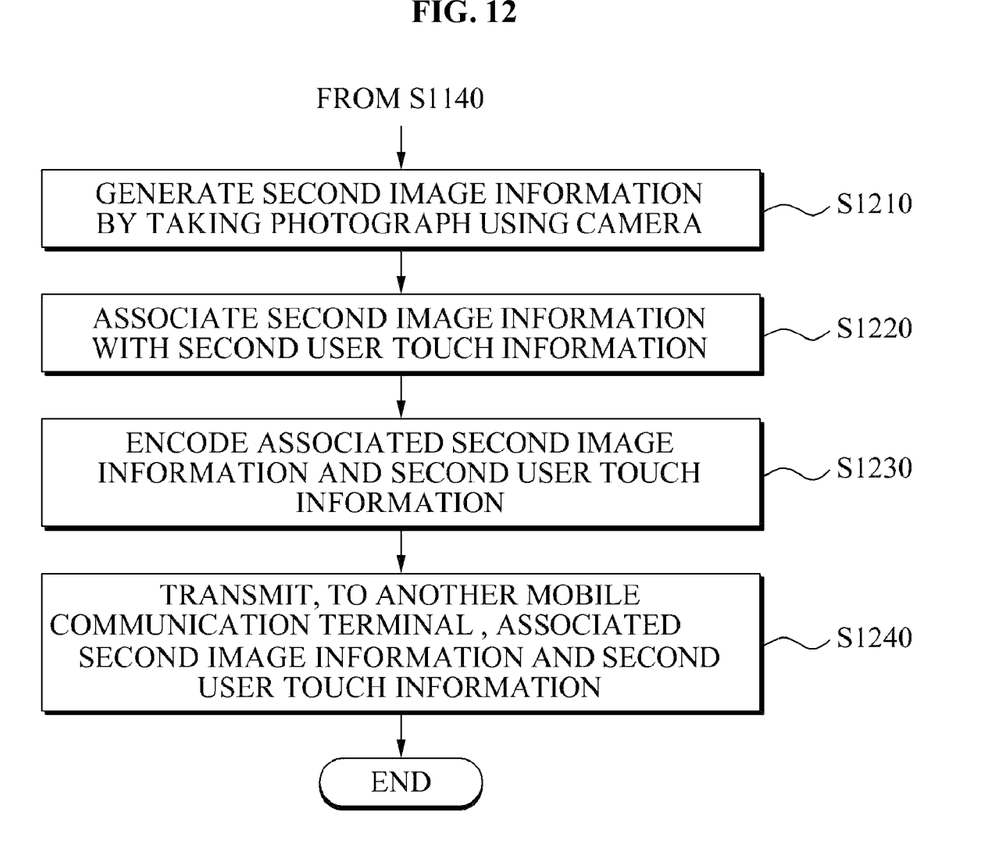

FIG. 11 and FIG. 12 are flowcharts illustrating a method of controlling a mobile communication terminal capable of sharing a display area during a video call according to an exemplary embodiment of the present invention. A method of controlling a mobile communication terminal capable of sharing a display area during a video call according to an exemplary embodiment of the present invention will be described with reference to FIG. 11 and FIG. 12.

In operation S1110, first user touch information input to another mobile communication terminal and first image information photographed in the other mobile communication terminal may be received.

In this instance, the first user touch information may refer to data information such as a memo, a picture, and the like generated by a user through a touch screen in a memo sharing area on a touch screen display area, and the first image information may refer to image information photographed through a camera in the other mobile communication terminal.

When receiving a UII message during a video call, the memo sharing area may be expanded, and the UII message may additionally include terminal control data, such as a vibration, an LED, and the like, and be delivered.

In operation S1120, the received first user touch information and first image information may be displayed.

That is, the received first user touch information and first image information may be displayed on a display, and each of the first user touch information and the first image information may be displayed in a separate area on the display.

In operation S1130, second user touch information may be generated by mapping touch information generated through a touch input of a user on the displayed first user touch information.

That is, the second user touch information may be generated by additionally generating data information, such as a memo, a picture, and the like, generated through a touch input of a user on the first user touch information received by the other mobile communication terminal.

The generated second user touch information and first image information may be controlled to be displayed in operation S1140, and the second user touch information may be transmitted to the other mobile communication terminal in operation S1150.

Transmitting of the second user touch information to the other mobile communication terminal in operation S1150 will be further described with reference to FIG. 12.

Second image information may be generated by taking a photograph using a camera in operation S1210, and the second image information may be associated with the second user touch information in operation S1220. That is, an image photographed by a user and a memo or a picture image input by the user may be associated to be provided to the other mobile communication terminal.

The associated second image information and second user touch information may be encoded in operation S1230, and the encoded second image information and second user touch information may be transmitted to the other mobile communication terminal in operation S1240.

That is, the second image information input after being photographed by a camera may be associated with the second user touch information, and be encoded to be transmitted to the other mobile communication terminal.

At the other mobile communication terminal, the second image information and the second user touch information may be decoded using the same scheme used for decoding a general video data, and be displayed on a screen.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile communication terminal, comprising:
a transceiver to receive first touch information from a counterpart terminal, the first touch information comprising an external coordinate value of a touch input inputted by a user of the counterpart terminal, the external coordinate value being calculated based on a coordinate of the touch input in a memo sharing area of the counterpart terminal;
an image signal processor to control the first touch information to be displayed in a memo sharing area of the mobile communication terminal, and to control image information to be displayed in the memo sharing area of the mobile communication terminal; and
a touch information processor to generate second touch information based on a touch input received on the memo sharing area of the mobile communication terminal in which the first touch information is displayed, the touch input received on the memo sharing area of the mobile communication terminal being inputted by a user of the mobile communication terminal,
wherein the image signal processor controls the first touch information and the second touch information to be displayed with the image information,
wherein, based on the external coordinate value of the touch input inputted by the user of the counterpart terminal, the first touch information is displayed on a location of the memo sharing area of the mobile communication terminal, the location of the memo sharing area of the mobile communication terminal being related to the coordinate of the touch input in the memo sharing area of the counterpart terminal, wherein the second touch information is displayed on a location corresponding to a coordinate value of the touch input received on the memo sharing area of the mobile communication terminal, and wherein the first touch information and the second touch information are shared between the mobile communication terminal and the counterpart terminal in real time.

2. The mobile communication terminal of claim 1, wherein the first touch information and the second touch information are displayed in an overlapping form on the image information.

3. The mobile communication terminal of claim 1, wherein the transceiver transmits the second touch information to the counterpart terminal.

4. The mobile communication terminal of claim 3, wherein the second touch information is transmitted to the counterpart terminal to be displayed with the first touch information on the memo sharing area of the counterpart terminal.

5. The mobile communication terminal of claim 1, wherein the image information is received from the counterpart terminal.

6. The mobile communication terminal of claim 1, wherein the image information is generated in the mobile communication terminal.

7. The mobile communication terminal of claim 1, wherein the image information corresponds to video call image information captured by a camera of the counterpart terminal or a camera of the mobile communication terminal.

8. A method for performing a touch input communication, the method comprising:

receiving first touch information from a counterpart terminal, the first touch information comprising an external coordinate value of a touch input inputted by a user of the counterpart terminal, the external coordinate value being calculated based on a coordinate of the touch input in a memo sharing area of the counterpart terminal;

controlling image information to be displayed in a memo sharing area of the mobile communication terminal, and controlling the first touch information to be displayed in the memo sharing area of the mobile communication terminal;

generating second touch information based on a touch input received on the memo sharing area of the mobile communication terminal, the touch input received on the memo sharing area of the mobile communication terminal being inputted by a user of the mobile communication terminal; and controlling the first touch information and the second touch information to be displayed with the image information, wherein, based on the external coordinate value of the touch input inputted by the user of the counterpart terminal, the first touch information is displayed on a location of the memo sharing area of the mobile communication terminal, the location of the memo sharing area of the mobile communication terminal being related to the coordinate of the touch input in the memo sharing area of the counterpart terminal, wherein the second touch information is displayed on a location corresponding to a coordinate value of the touch input received on the memo sharing area of the mobile communication terminal, and wherein the first touch information and the second touch information are shared between the mobile communication terminal and the counterpart terminal in real time.

9. The method of claim 8, wherein the first touch information and the second touch information are displayed in an overlapping form on the image information.

10. The method of claim 8, further comprising transmitting the second touch information to the counterpart terminal.

11. The method of claim 10, wherein the second touch information is transmitted to the counterpart terminal to be displayed with the first touch information on the memo sharing area of the counterpart terminal.

12. The method of claim 8, wherein the image information is received from the counterpart terminal.

13. The method of claim 8, further comprising generating the image information.

14. The method of claim 8, wherein the image information corresponds to video call image information captured by a camera of the counterpart terminal or a camera of the mobile communication terminal.

15. A method for performing a touch input communication by a user terminal, the method comprising:

performing a wireless communication with a counterpart terminal, and providing a memo sharing area on a display of the user terminal, the memo sharing area configured to be shared with the counterpart terminal;

receiving, from the counterpart terminal, information about a first touch input converted to a coordinate value, and displaying data information corresponding to the first touch input in the memo sharing area of the user terminal, the first touch input being received in a memo sharing area of the counterpart terminal;

transmitting, to the counterpart terminal, information about a second touch input converted to a coordinate value, the second touch input being received on the display of the user terminal; and displaying data information corresponding to the second touch input in the memo sharing area of the user terminal, wherein, based on the coordinate value of the first touch input, the data information corresponding to the first touch input is displayed on a location of the memo sharing area of the user terminal, the location of the memo sharing area of the user terminal being related to the coordinate value of the first touch input in the memo sharing area of the counterpart terminal, wherein the data information corresponding to the second touch input is displayed on a location of the memo sharing area corresponding to the coordinate value of the second touch input, and wherein the data information corresponding to the second touch input is shared with the counterpart terminal in real time.

16. The method of claim 15, wherein the data information corresponding to the first touch input comprises a graphical path of the first touch input.

17. The method of claim 15, wherein the first touch input is a touch input inputted on the memo sharing area of the counterpart terminal via a stick, a stylus, a pen, or a finger.

18. The method of claim 15, further comprising controlling the data information corresponding to the first touch input and the data information corresponding to the second touch input to be displayed in an overlapping form on image information displayed on the memo sharing area of the user terminal.

* * * * *